United States Patent
Watanabe

(10) Patent No.: US 9,291,259 B2
(45) Date of Patent: Mar. 22, 2016

(54) SHIFT DEVICE

(71) Applicant: KABUSHIKI KAISHA TOKAI RIKA DENKI SEISAKUSHO, Aichi (JP)

(72) Inventor: Hironori Watanabe, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/278,589

(22) Filed: May 15, 2014

(65) Prior Publication Data

US 2014/0345409 A1  Nov. 27, 2014

(30) Foreign Application Priority Data

May 21, 2013  (JP) .................. 2013-107318

(51) Int. Cl.
*F16H 59/08* (2006.01)
*F16H 59/12* (2006.01)
*B60K 37/06* (2006.01)

(52) U.S. Cl.
CPC .......... *F16H 59/08* (2013.01); *F16H 2059/081* (2013.01); *Y10T 74/2014* (2015.01)

(58) Field of Classification Search
CPC ......... F16H 59/08; F16H 59/02; F16H 59/10; F16H 59/042; F16H 59/0278; F16H 59/04; F16H 59/12; F16H 2059/081; F16H 61/24; B60K 37/06; B60K 20/02; Y10T 74/2014; Y10T 74/2003; Y10T 74/20098; Y10T 74/20122; Y10T 74/20128; Y10T 74/20244; Y10T 74/1418
USPC ................ 74/473.3, 473.12, 483 PB, 473.21, 74/473.27, 473.28, 10.1, 10.2, 10.22, 10.7, 74/553, 552; 200/538, 564, 520, 519, 11 R, 200/50.36
See application file for complete search history.

(56) References Cited

U.S. PATENT DOCUMENTS

| | | | | |
|---|---|---|---|---|
| 5,605,225 A | * | 2/1997 | Schaeffer ...................... | 200/539 |
| 6,268,577 B1 | * | 7/2001 | Marquardt et al. ........... | 200/330 |
| 6,483,062 B1 | * | 11/2002 | Herdegen et al. ............. | 200/538 |
| 6,636,197 B1 | * | 10/2003 | Goldenberg et al. ......... | 345/156 |
| 6,918,313 B2 | * | 7/2005 | Kojima et al. ................ | 74/10.27 |
| 7,571,662 B2 | * | 8/2009 | Pickering et al. ............. | 74/473.3 |
| 8,508,511 B2 | * | 8/2013 | Tanaka et al. ................. | 345/184 |
| 8,513,557 B2 | * | 8/2013 | Wahrenberg ................... | 200/520 |
| 8,607,663 B2 | * | 12/2013 | Takehara et al. ............... | 74/543 |
| 8,809,716 B2 | * | 8/2014 | Gohng et al. .................. | 200/336 |
| 2002/0152827 A1 | * | 10/2002 | Hayashi et al. ............... | 74/473.3 |
| 2005/0040018 A1 | * | 2/2005 | Gotoh .......................... | 200/17 R |

(Continued)

FOREIGN PATENT DOCUMENTS

JP  2006-131147  5/2006
JP  2010-137623  6/2010

*Primary Examiner* — William Kelleher
*Assistant Examiner* — Jude Agendia
(74) *Attorney, Agent, or Firm* — Greenblum & Bernstein, P.L.C.

(57) ABSTRACT

A shift device includes a knob that is rotatable about an axis and movable when pushed in the axial direction. An alternating action generation unit switches the knob, whenever the knob is pushed, between a base position and a hold position, which is separated from the base position in the axial direction. A base position return unit returns the knob to the base position when the knob has been rotated from the base position. A push restriction unit restricts pushing of the knob that has been rotated from the base position. A rotation restriction unit restricts rotation of the knob that is located at the hold position.

5 Claims, 6 Drawing Sheets

(56) References Cited

U.S. PATENT DOCUMENTS

| | | |
|---|---|---|
| 2006/0100059 A1 | 5/2006 | Nonaka |
| 2006/0283286 A1* | 12/2006 | Maeda et al. .................... 74/553 |
| 2011/0219901 A1* | 9/2011 | Giefer et al. ................. 74/473.3 |
| 2013/0270082 A1* | 10/2013 | Harazawa ...................... 200/329 |

* cited by examiner

SHIFT DEVICE

CROSS-REFERENCE TO RELATED APPLICATIONS

This application is based upon and claims the benefit of priority from prior Japanese Patent Application No. 2013-107318, filed on May 21, 2013, the entire contents of which are incorporated herein by reference.

BACKGROUND ART

The present invention relates to a shift device.

To improve operability, a known operation devices combines switches that are operated in different manners. Japanese Laid-Open Patent Publication No. 2010-137623 discloses a shift device used in vehicles. The shift device combines a rotatable knob with a push button. In the shift device, the knob is rotated to switch modes of the transmission. The push button is pushed to start or stop the engine.

The shift device is normally located beside the driver seat. Thus, the driver often operates the shift device without looking at the shift device. In particular, the shift device of patent document 1 is easy to operate. However, this may result in erroneous operation of the shift device. The operation of the shift device may affect the driving of the vehicle. Thus, it is desirable that the shift device be operated more accurately than other operation devices.

One aspect of the present invention is a shift device including a knob configured to be rotatable about an axis and movable when pushed in the axial direction. An alternating action generation unit is configured to switch the knob, whenever the knob is pushed, between a base position and a hold position separated from the base position in the axial direction. A base position return unit is configured to return the knob to the base position when the knob has been rotated from the base position. A push restriction unit is configured to restrict pushing of the knob that has been rotated from the base position. A rotation restriction unit is configured to restrict rotation of the knob that is located at the hold position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a shift device will now be described. The shift device is located in the proximity of the driver seat and operated to switch modes of the transmission.

Figure 1:
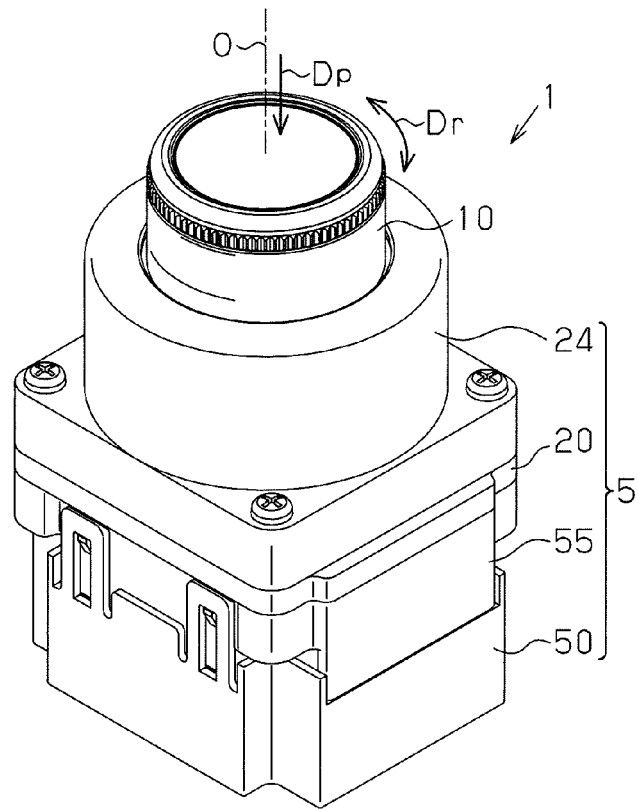
FIG. 1 is a perspective view of a shift device according to one embodiment of the present invention.

Referring to FIG. 1, the shift device 1 includes a housing 5 and a knob 10. The housing 5 is box-shaped and fixed to the vehicle body. The knob 10 is cylindrical and supported on the housing 5. The housing 5 includes an upper case 24, a lower cover 50, a middle case 55, and an upper cover 20. The knob 10 includes a rotation axis O that extends in the vertical direction as viewed in FIG. 1. The knob 10 is configured to be movable along and rotatable about the rotation axis. As shown by arrow Dp in FIG. 1, the knob 10 is pushed toward the upper surface of the upper case 24. Further, as shown by arrow Dr in FIG. 1, the knob 10 is rotated about rotation axis O.

Figure 2:
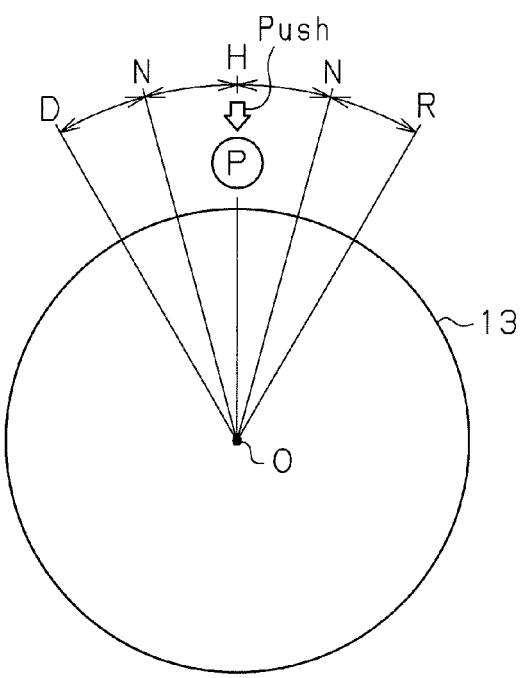
FIG. 2 is a plan view of a knob in the shift device of FIG. 1.

Referring to FIG. 2, when viewing the knob 10 from above, a home position "H" is set at the twelve o'clock position of the knob 10. A neutral position "N" and a reverse position "R" are sequentially set in the clockwise position from the home position "H" on the knob 10. Further, a neutral position "N" and a drive position "D" are sequentially set in the counterclockwise position from the home position "H" on the knob 10. The driver rotates the knob 10 from the home position "H" to the neutral position "N", the drive position "D", or the reverse position "R". Then, the driver releases the knob 10. This returns the knob 10 to the home position "H".

When the knob 10 reaches one of the three positions, namely, the neutral position "N", the drive position "D", or the reverse position "R", the transmission is switched to the mode corresponding to that position.

The knob 10 may also be pushed from the home position "H" to a parking position "P". When the knob 10 is pushed from the home position "H" to the parking position "P", the knob 10 is held at the parking position "P". When the knob 10 is located at the parking position "P", operation of the knob 10 is restricted.

As shown by the large arrow in FIG. 2, under a situation in which the knob 10 is held at the parking position "P" and the transmission is maintained in the parking mode, when the knob 10 is pushed again, the knob 10 is released and returned to the original home position "H". This allows the transmission modes to be switched. When the knob 10 is returned to the original position, the transmission remains in the parking mode until the knob 10 is operated.

The mechanical structure of the shift device 1 will now be described.

Figure 3:
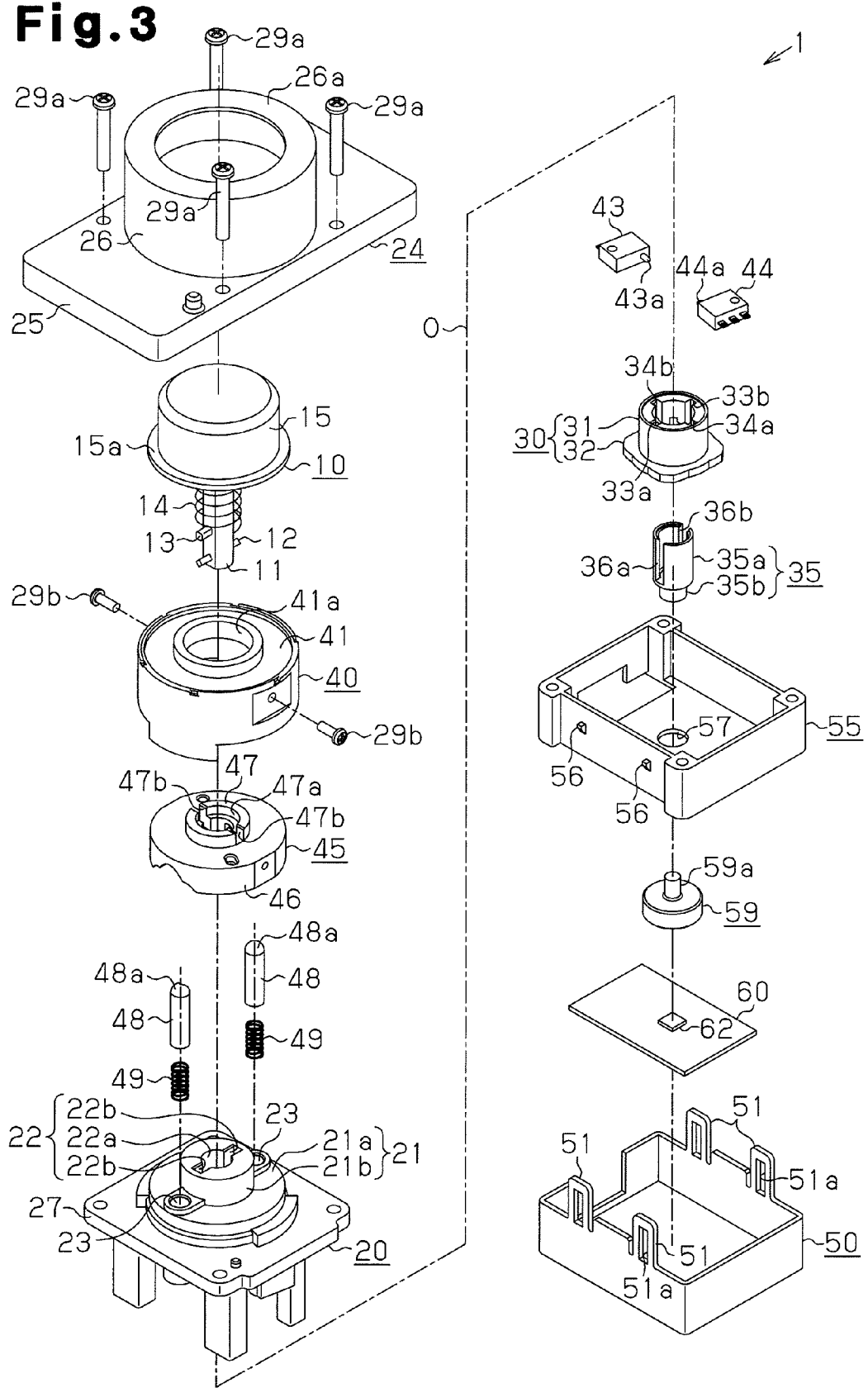
FIG. 3 is an exploded perspective view of the shift device of FIG. 1.

As shown in FIG. 3, the shift device 1 includes the upper case 24, the knob 10, a knob guide 40, a momentary member 45, the upper cover 20, an outer restriction member 30, an inner restriction member 35, the middle case 55, and the lower cover 50.

The lower cover 50 is box-shaped and open toward the upper side. The lower cover 50 includes two opposing long walls and two arms 51 extending upward from the upper portion of each long wall. Each arm 51 includes a slot 51a. A substrate 60 is fixed to the bottom wall in the lower cover 50. A magnetic sensor 62 is mounted on the substrate 60.

The middle case 55 is box-shaped and open toward the upper side. The middle case 55 includes two opposing long walls and two hooks 56 extending upward from the outer surface of each long wall. Further, the middle case 55 includes a bottom wall and a circular insertion hole 57 extending through the central section of the bottom wall.

The upper cover 20 includes a tetragonal base 27 and a stepped cylindrical projection 21 formed on the base 27. In detail, the projection 21 includes a disk-shaped large diameter portion 21a and a cylindrical small diameter portion 21b, which is formed on the central section of the large diameter portion 21a.

A through hole 22 extends through the small diameter portion 21b along the rotation axis O. The through hole 22 includes a cylindrical main hole 22a and two polygonal sub-holes 22b. The two sub-holes 22b are arranged on opposite sides of the main hole 22a in the radial direction. Two micro-switches 43 and 44 are fixed to the lower surface of the upper cover 20 in the proximity of the through hole 22. The two micro-switches 43 and 44 are arranged on opposite sides of the through hole 22. Further, two spring seats 23 are arranged on the upper surface of the large diameter portion 21a and located on opposite sides of the small diameter portion 21b. Each spring seat 23 is tubular and includes an upper opening to receive a spring 49, which is a coil spring.

The knob 10 includes a cylindrical operation portion 15 and a tetragonal post shaped shaft 11. The shaft 11 extends toward the lower side from the middle section in the lower surface of the operation portion 15. A flange 15a is formed on the lower end of the operation portion 15.

A polygonal pin 12 is coupled to the shaft 11 proximal to the distal end of the shaft 11. A through hole extends through the shaft 11 in a direction orthogonal to the axis of the shaft 11. The pin 12 is fitted into the through hole so that the two ends of the pin 12 project from the peripheral surface of the shaft 11. Further, the shaft 11 includes two coupling projections 13 located closer to the operation portion 15 than the pin 12. Each coupling projection 13 is polygonal and formed integrally with the shaft 11. Further, the coupling projections 13 and the pin 12 project in the same direction. The shaft 11 is fitted into the main hole 22a of the through hole 22. The two ends of the pin 12 are respectively fitted into the two sub-holes 22b of the through hole 22. A coil spring 14 is attached to the shaft 11 between the lower surface of the operation portion 15 and the upper surfaces of the coupling projections 13.

The lower end of the shaft 11 that includes the pin 12 is formed to permit rotation and pushing of the knob 10 and produce an alternating action when the knob 10 is pushed. For example, a through hole extends through the upper cover 20 in the vertical direction. The shaft 11 is inserted through the through hole of the upper cover 20. The inner restriction member 35, which is stepped and tubular, and the outer restriction member 30, which is flanged and tubular, are concentrically coupled to the lower end of the shaft 11. More specifically, inner restriction member 35 is fitted from the lower side to the lower end of the shaft 11. Further, the outer restriction member 30 is fitted from the lower side to the inner restriction member 35, which has been fitted to the shaft 11.

The inner restriction member 35 includes a large diameter portion 35a and a small diameter portion 35b, which is located below the large diameter portion 35a. Two slits 36a and 36b extend through the circumferential wall of the large diameter portion 35a parallel to the rotation axis O. The two slits 36a and 36b are located at opposite sides of the large diameter portion 35a in the radial direction. The two ends of the pin 12 may be respectively fitted into the two slits 36a and 36b from above.

The outer restriction member 30 includes a cylindrical tube 31 and a flange 32 located at the lower portion of the tube 31. A set of two grooves 33a and 33b and a set of two grooves 34a and 34b are formed in the inner surface of the tube 31. When viewing the tube 31 from above, the locations of the grooves 33a, 33b, 34a, and 34b are set so that a hypothetical line connecting the two grooves 33a and 33b is orthogonal to a hypothetical line connecting the two grooves 34a and 34b. The two ends of the pin 12 may be fitted from above into the two grooves 33a and 33b and the two grooves 34a and 34b.

The small diameter portion 35b is exposed from the bottom wall of the middle case 55 through the insertion hole 57. A cylindrical permanent magnet 59 is coupled from below to the lower end of the small diameter portion 35b. Under this situation, the lower cover 50 is coupled to the lower portion of the middle case 55. Here, when moving the middle case 55 and the lower cover 50 toward each other, the middle case 55 is received between the two sets of the arms 51 to couple the lower cover 50 to lower portion of the middle case 55. The slots 51a of the arms 51 are respectively engaged with the hooks 56 of the middle case 55 to fix the lower cover 50 to the lower portion of the middle case 55. The substrate 60 is fixed to the bottom wall in the lower cover 50.

Rotation of the knob 10 rotates the permanent magnet 59 with the inner restriction member 35. The magnetic sensor 62 includes an MR sensor using a magnetoresistance effect element (MR element). The magnetic sensor 62 generates an electric signal in correspondence with changes in the direction of the magnetic field applied to the magnetic sensor 62. The permanent magnet 59, which is magnetized to two poles in the radial direction, opposes the magnetic sensor 62 in the axial direction. Further, the permanent magnet 59 is rotated in cooperation with the knob 10. Thus, the direction of the magnetic field applied to the magnetic sensor 62 changes in correspondence with the rotation of the knob 10.

The upper case 24 includes a tetragonal base 25 and a cylindrical tube 26. A flange 26a extends toward the inner side from the upper end of the tube 26 at the opposite side of the base 25.

Figure 4:
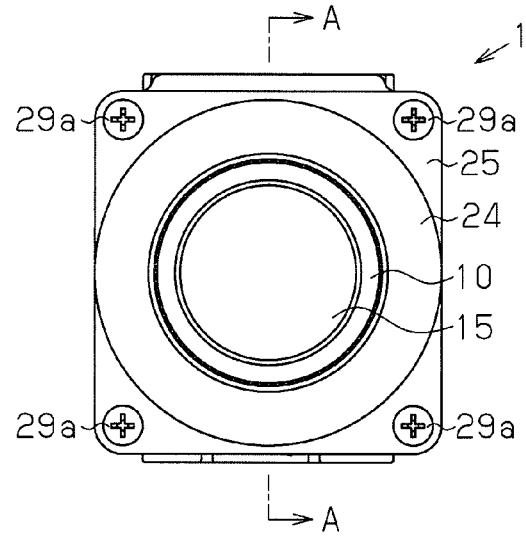
FIG. 4 is a plan view of the shift device of FIG. 1.
Figure 5:
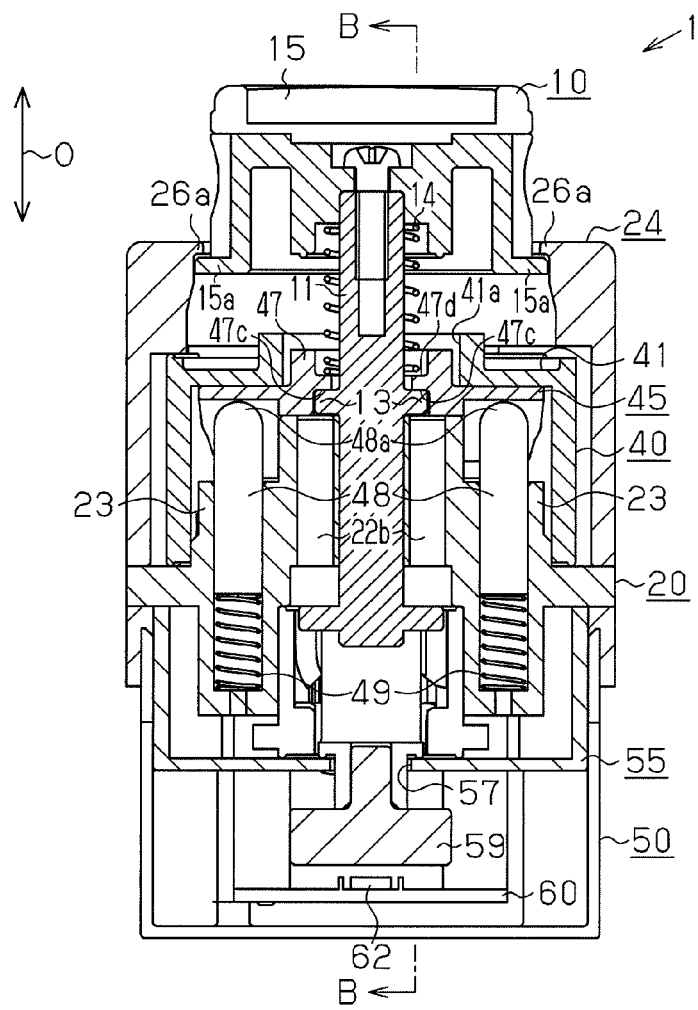
FIG. 5 is a cross-sectional view taken along line A-A in FIG. 4.

As shown in FIG. 5, the knob 10 is fitted into the tube 26 from the lower side, and the flange 26a of the tube 26 contacts the flange 15a of the knob 10 from the upper side. In this manner, the upper case 24 holds the knob 10 with the operation portion 15 exposed from the upper case 24. As shown in FIGS. 3 and 4, the upper case 24, the upper cover 20, and the middle case 55 are overlapped in the direction of the rotation axis O. Four screws 29a are used to fix the upper case 24 to the upper cover 20 and the middle case 55. Consequently, the knob guide 40 and the momentary member 45 are held between the knob 10 and the upper cover 20 in the upper case 24.

As shown in FIG. 3, the knob guide 40 is tubular and open toward the lower side. The surface of the knob guide 40 facing the knob 10 defines a top surface 41. The top surface 41 includes a through hole 41a for insertion of shaft 11. The knob guide 40 is positioned to cover the momentary member 45. Two through holes extend through the circumferential wall of the knob guide 40 at opposite sides of the through hole 41a. Two screws 29b are inserted into the two through holes to integrate the knob guide 40 and the momentary member 45.

The momentary member 45 includes a disk-shaped base plate 46 and a coupler 47. The coupler 47 is tubular and located on the central section of the upper surface of the base plate 46. A shaft hole 47a extends through the coupler 47 in the direction of the rotation axis O to receive the shaft 11. Further, as shown in FIG. 5, an inner flange 47d extends from the basal end of the coupler 47 in a direction orthogonal to the rotation axis O. The inner flange 47d holds the lower end of the coil spring 14, and the coupler 47 covers the coil spring 14.

As shown in FIG. 3, the coupler 47 includes two insertion slits 47b. Each insertion slit 47b extends parallel to the rotation axis O and through the circumferential wall of the coupler 47 around the shaft hole 47a. The two insertion slits 47b are located on opposite sides of the rotation axis O.

Figure 7:
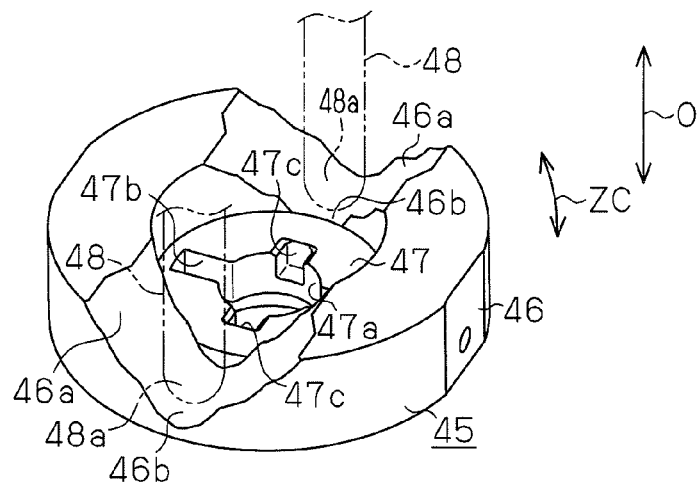
FIG. 7 is a perspective view showing a base plate including grooves.

As shown in FIG. 7, the coupler 47 has a bottom wall (facing upward in FIG. 7) that includes two coupling recesses 47c. Each coupling recess 47c does not extend through the bottom wall in the axial direction but is in communication with the shaft hole 47a. The coupling projections 13 are receivable in the coupling recesses 47c, respectively. The locations of the two coupling recesses 47c and the two insertion slits 47b are set so that a hypothetical line connecting the two coupling recesses 47c is orthogonal to a hypothetical line connecting the two insertion slits 47b. Further, the circumferential wall of the base plate 46 has a bottom surface (upper surface in FIG. 7) including two inwardly curved grooves 46a. The two grooves 46a are formed on opposite sides of the coupler 47. Each groove 46a is deepest at a central portion 46b and becomes shallow at locations farther from the central portion 46b in the circumferential direction ZC.

A momentary pin 48 is urged against each groove 46a. The momentary pin 48 is rod-shaped and includes a spherical distal end 48a facing toward the groove 46a.

As shown in FIG. 5, the momentary pins 48 are respectively received in the spring seats 23 of the upper cover 20. A spring 49 is arranged between the inner bottom surface of each spring seat 23 and the distal end 48a of the corresponding momentary pin 48. The elastic force of the spring 49 urges the distal end 48a of the momentary pin 48 against the corresponding groove 46a.

Figure 6:
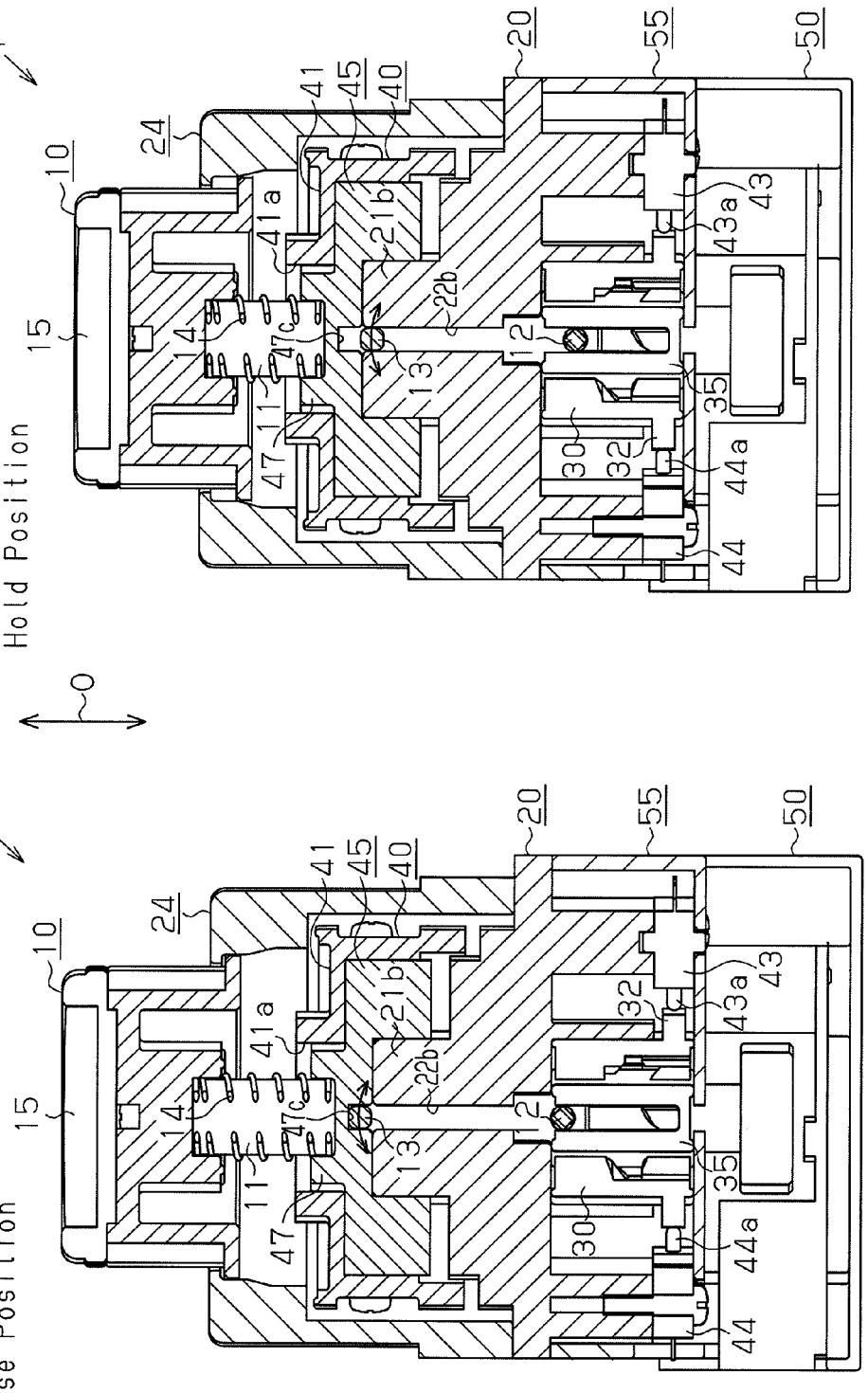
FIGS. 6A and 6B are cross-sectional views taken along line FIG. 5 when the knob is in a base position and a hold portion.

The substrate 60, the magnetic sensor 62, and the permanent magnet 59 are accommodated between the lower cover 50 and the middle case 55. The magnetic sensor 62 and the permanent magnet 59 on the substrate 60 are faced toward each other in the vertical direction of the shift device 1. As shown in FIG. 6A, the two micro-switches 43 and 44, the inner restriction member 35, and the outer restriction member 30 are accommodated in the middle case 55.

The two micro-switches 43 and 44 are fixed to the lower surface of the upper cover 20. The micro-switch 43 includes an actuator 43a, and the micro-switch 44 includes an actuator 44a. The actuators 43a and 44a face toward the circumferential surface of the flange 32 in the radial direction of the outer restriction member 30. When the actuators 43a and 44a are moved by external force, the micro-switches 43 and 44 are switched ON.

The alternating action generated when the knob 10 is pushed will now be described.

Referring to FIGS. 6A and 6B, pushing of the knob 10 moves the knob 10 in the axial direction and switches the knob 10 between a base position (home position "H") and a hold position (parking position "P"). More specifically, when the knob 10 is pushed, the knob 10 is switched from the base position to the hold position and held at the hold position. When the knob 10 is pushed at the hold position, the knob 10 is switched back to the base position from the hold position. These actions are referred to as the alternating action.

Figure 8:
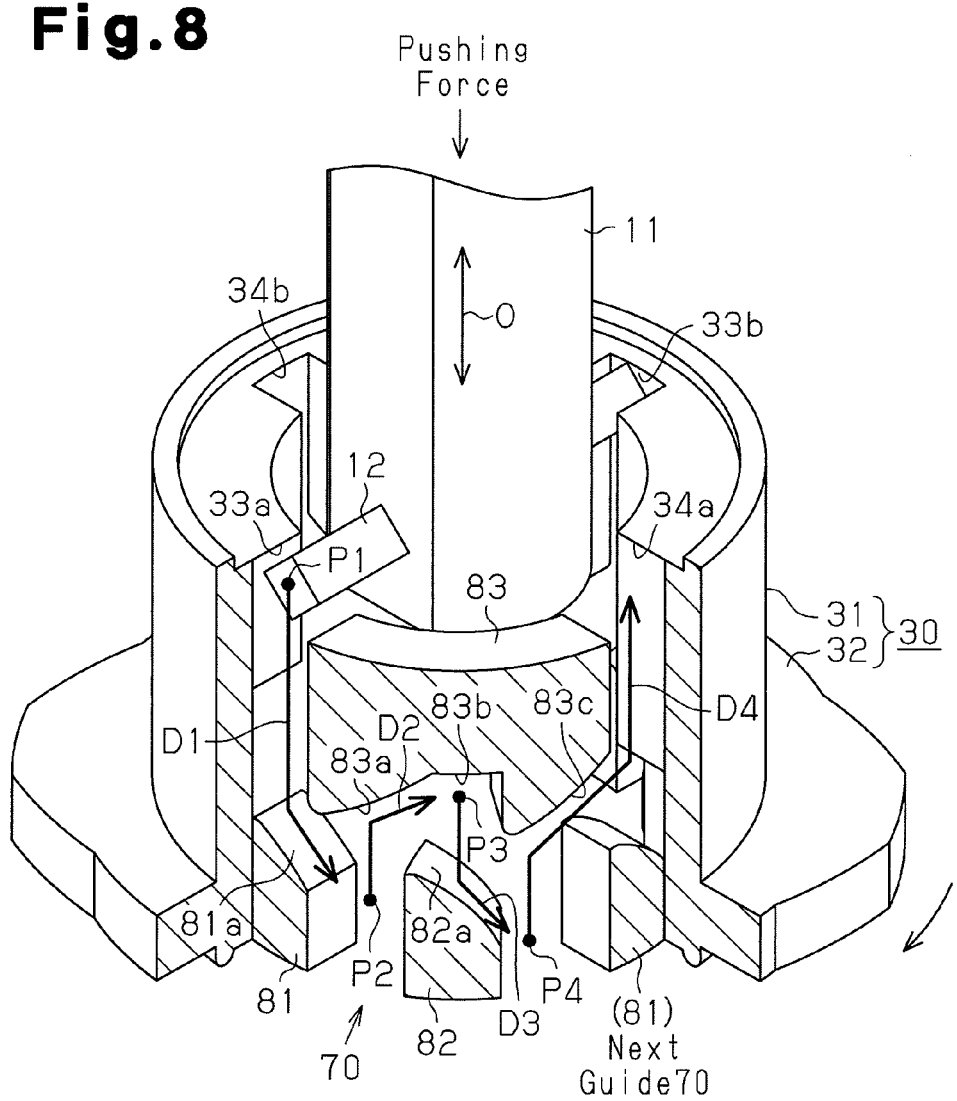
FIG. 8 is a partially cutaway perspective view illustrating movement of a pin relative to an inner restriction member when the knob is pushed.

As shown in FIG. 8, four guides 70 (only one shown in FIG. 8) are arranged in the tube 31 of the outer restriction member 30 to produce the alternating action when the knob 10 is pushed. FIG. 8 does not show the inner restriction member 35, which would be located between the shaft 11 and the outer restriction member 30.

The four guides 70 are located between the groove 33a and the groove 34a, the groove 34a and the groove 34b, the groove 33b and the groove 34b, and the groove 34b and the groove 33a. The guides 70 each have the same structure. Each guide 70 includes first to third guide projections 81 to 83. The first and second guide projections 81 and 82 are located in the lower portion of the outer restriction member 30. The third guide projection 83 is located in the upper portion of the outer restriction member 30 above the first and second guide projections.

The route along which the pin 12 moves will now be described. The two ends of the pin 12 are guided by two of the guides 70 that are located at opposite sides of the outer restriction member 30 in the radial direction. The route taken by the pin 12 in a single guide 70 will now be described using arrows D1 to D4, which indicates movement of the pin 12 relative to the outer restriction member 30. Actually, the outer restriction member 30 rotates about the rotation axis O, and the pin 12 does not rotate about the rotation axis O.

When the knob 10 is located at the base position, the pin 12 is held at an initial position P1, which is located at the upper portion of the groove 33a. From this condition, when the knob 10 is pushed toward the lower side, as shown by arrow D1, the pin 12 moves toward the lower side along the groove 33a. Then, as the pin 12 moves further toward the lower side, a guide surface 81a of the first guide projection 81 guides the pin 12.

When the pin 12 is pushed to a first push position P2 and the knob 10 is released, as shown by arrow D2, the elastic force of the coil spring 14 moves the pin 12 toward the upper side. Then, the pin 12 comes into contact with a guide surface 83a of the third projection 83. The guide surface 83a guides the pin 12 and rotates the outer restriction member 30 in the clockwise direction. The elastic force of the coil spring 14 holds the pin 12 at a hold position P3, which corresponds to a hold surface 83b of the third guide projection 83. Under this condition, the knob 10 is held at a hold position.

When the knob 10 is at the hold position and the knob 10 is pushed again, the pin 12 is moved toward the lower side as shown by arrow D3. Then, the pin 12 comes into contact with a guide surface 82a of the second guide projection 82. The guide surface 82a guides the pin 12 and rotates the outer restriction member 30 in the clockwise direction. When the pin 12 is pushed to a second push position P4 and the knob 10 is released, as shown by arrow D4, the elastic force of the coil spring 14 moves the pin 12 toward the upper side. Then, the pin 12 comes into contact with a guide surface 83c of the third projection 83. The guide surface 83c guides the pin 12 and rotates the outer restriction member 30 in the clockwise direction. The elastic force of the coil spring 14 moves the pin 12 toward the upper side along the groove 34a. This returns the pin 12 to the height corresponding to the next initial position P1. As a result, the knob 10 is returned to the base position. In this manner, whenever the knob 10 is pushed, the outer restriction member 30 is rotated in the clockwise direction by 45°.

When the flange 32 is rotated by 45°, the actuators 43a and 44a of the micro-switches 43 and 44 are switched between projected and retracted positions. The micro-switches 43 and 44 are switched ON and OFF in accordance with the position of the knob 10 (base position or hold position). The pin 12, the guides 70, and the coil spring 14 form an example of an alternating action generation unit.

Referring to FIG. 5, when the knob 10 is pushed, the coil spring 14 is compressed between the lower surface of the operation portion 15 (surface at the side of the shaft 11) and the inner flange 47d of the coupler 47. When the knob 10 is pushed, the elastic force of the coil spring 14 applies a reaction force to the knob 10. The spring constant of the coil spring 14 sets the reaction force when the knob 10 is pushed. The coil spring 14 is one example of a pushing reaction force application unit.

Referring to FIGS. 5 and 6A, when the knob 10 is located at the base position (home position "H"), the coupling projections 13 are fitted to the coupling recesses 47c. Thus, the knob 10 is in a coupled condition. In this case, the knob 10 is rotatable integrally with the momentary member 45.

Referring to FIG. 7, when the knob 10 is rotated from the base position in each direction, the momentary member 45 is rotated relative to the momentary pins 48 in the circumferential direction ZC. As a result, the distal end 48a of each momentary pin 48 is moved relative to the momentary member 45 along the corresponding groove 46a from the central portion 46b of the groove 46a. This moves the momentary pin 48 toward the spring 49 and compresses the spring 49. Rotation of the knob 10 moves the knob 10 away from the base position and greatly compresses the spring 49. Thus, the distal end 48a of the momentary pin 48 applies a large urging force to the groove 46a. This increases the reaction force of the knob 10 in correspondence with the rotated amount of the knob 10.

The reaction force increase as the spring constant of the spring 49 increases. Further, an increase in the gradient of the sloped surface of the groove 46a also increases the increasing rate of the reaction force corresponding to the rotated amount of the knob 10.

When the knob 10 is released, the elastic force of the springs 49 relatively moves the momentary pins 48 along the grooves 46a toward the central portions 46b of the grooves 46a. This rotates the momentary member 45 so that the distal end 48a of each momentary pin 48 is located at the corresponding central portion 46b of the momentary member 45. Accordingly, when the knob 10 is released, the knob 10 produces a momentary action in which the knob 10 is automatically returned to the base position.

The springs 49, the grooves 46a, and the momentary pins 48 form an example of a base position return unit and a rotation reaction application unit. The base plate 46 that includes the coupling projections 13 and the coupling recesses 47c is one example of a coupling switching unit.

Referring to FIG. 6A, when the knob 10 is at the base position, the coupling recess 47c is in communication with the corresponding sub-holes 22b of the small diameter portion 21b in the axial direction. Thus, when the knob 10 is pushed, the coupling projections 13 move into the sub-holes 22b from the coupling recesses 47c. This allows for the knob 10 to be pushed at the base position, namely, the home position "H".

When the knob 10 is rotated from the base position, the coupling projections 13 are separated from the sub-holes 22b. Thus, for example, when the knob 10 is pushed under a situation rotated from the home position "H", the coupling projections 13 interfere with the upper surface of the small diameter portion 21b. This restricts pushing of the knob 10. The coupling projections 13 and the small diameter portion 21b form an example of a pushing restriction unit.

Referring to FIG. 6B, when the knob 10 is located at the hold position (parking position "P"), the knob 10 is in an uncoupled condition in which the coupling projections 13 are released from the coupling recesses 47c and located in the sub-holes 22b of the small diameter portion 21b. In the uncoupled condition, the shaft 11 and the momentary member 45 are uncoupled from each other. Further, when force in the rotation direction is applied to the knob 10, the coupling projections 13 interfere with the side walls of the sub-holes 22b. This restricts rotation of the knob 10. The two coupling projections 13 and the small diameter portion 21b that includes the two sub-holes 22b form an example of a rotation restriction unit.

The electrical configuration of the shift device 1 will now be described.

Figure 9:
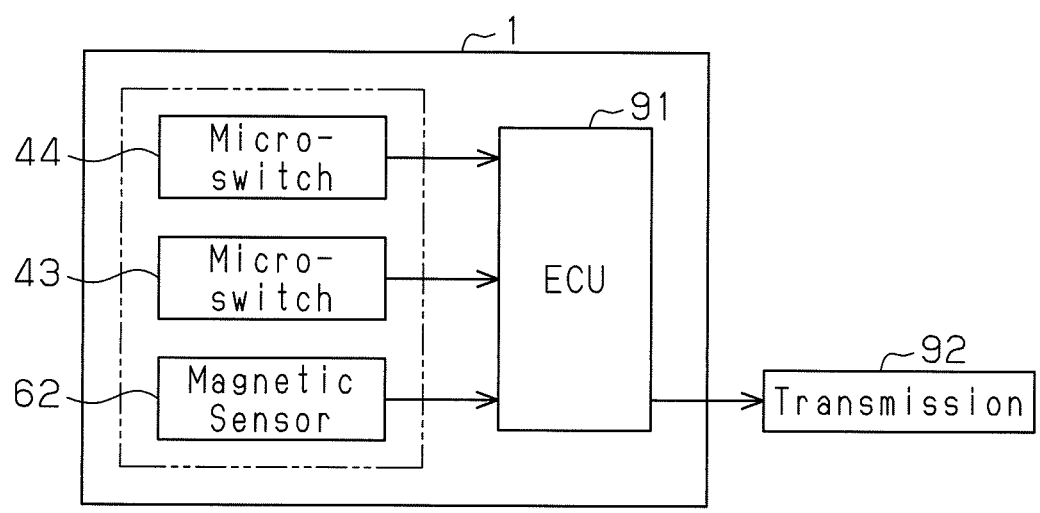
FIG. 9 is a block diagram illustrating the electric configuration of the shift device of FIG. 1.

As shown in FIG. 9, the shift device 1 includes an electronic control unit 91, which is connected to the magnetic sensor 62 and the two micro-switches 43 and 44. The electronic control unit 91 is also connected to a transmission 92.

When determining from the activation and deactivation of the two micro-switches 43 and 44 that the knob 10 is located at the parking position "P", the electronic control unit 91 switches the transmission 92 to the parking mode. Further, when determining from the activation and deactivation of the two micro-switches 43 and 44 that the knob 10 is located at the home position "H", the electronic control unit 91 releases the transmission 92 from the parking mode.

The electronic control unit 91 detects the rotation position ("H", "R", "N", or "D") of the knob 10 from the electric signal generated by the magnetic sensor. Further, the electronic control unit 91 switches the mode of the transmission 92 in correspondence with the rotation position of the knob 10.

The present embodiment has the advantages described below.

(1) When the knob 10 is rotated from the base position (home position "H"), interference of the coupling projections 13 with the upper surface of the small diameter portion 21b restricts pushing of the knob 10. Further, when the knob 10 is located at the hole position (parking position "P"), interference of the coupling projections 13 with the side walls of the sub-holes 22b restricts rotation of the knob 10. In this manner, by restricting the movement of the knob 10, the driver may recognize the shift position based on whether or not the knob 10 may be rotated and whether or not the knob 10 may be pushed. This reduces erroneous operation of the knob 10. In particular, the present example restricts rotation of the knob 10 when located at the parking position "P" and restricts pushing of the knob 10 when located at the parking position "P". This allows for the driver to easily recognize when the knob 10 is located at the parking position and when the knob 10 is moved to the parking position P. The shifting of the knob 10 to and from the parking position "P" are particularly significant since this determines whether or not the vehicle may be driven.

(2) The structure for applying reaction force when pushing the knob 10 (coil spring 14) is separate from the structure for applying reaction force when rotating the knob 10 (springs 49, grooves 46a, and momentary pins 48). This eliminates the correlation of the pushing reaction force and the rotation reaction force. Thus, for example, the setting of different spring constants for the two springs 49 and the coil spring 14 allows for the setting of a desirable pushing reaction force and a desirable rotation reaction force.

(3) When the coupling projections 13 are fitted to the coupling recesses 47c (coupled condition), the springs 49 and the momentary pins 48 apply rotation reaction force to the knob 10. Further, the coupling projections 13 may be released from the coupling recesses 47c (uncoupled condition). This completely eliminates the influence the urging force applied to the momentary member 45 by the momentary pins 48 has on the knob 10.

(4) The grooves 46a are formed in the lower surface of the base plate 46, and each momentary pin 48 is urged toward the corresponding groove 46a from the lower side of the base plate 46. In other words, the knob 10, the base plate 46, and the momentary pins 48 are arranged parallel to the rotation axis O. This limits enlargement of the shift device 1 in a direction orthogonal to the rotation axis O.

It should be apparent to those skilled in the art that the present invention may be embodied in many other specific forms without departing from the spirit or scope of the invention. Particularly, it should be understood that the present invention may be embodied in the following forms.

In the above embodiment, the alternating action generation unit is formed by the pin 12, the guides 70, and the like. Instead, the alternating action generation unit may be formed by, for example, a heart cam mechanism.

In the above embodiment, rotation of the knob 10 is restricted by interference of the coupling projections 13 with the side walls of the sub-holes 22b. However, the rotation restriction unit is not limited to such a structure. For example, an actuator may be added, and an output shaft of the actuator may be fitted to a recess formed in the pin 12 to restrict rotation of the knob 10.

The rotation reaction force application unit formed by the springs 49, the grooves 46a, and the momentary pins 48 in the above embodiment is only one example. Instead, for example, the groove 46a may be formed on the circumferential surface of the base plate 46, and the momentary pin 48 may be urged against the groove 46a. Alternatively, the groove 46a may be formed in the upper surface of the base plate 46, and the momentary pin 48 may be urged against the base plate 46 from the upper side.

In the above embodiment, the shift position may be changed in correspondence with the position of the knob 10. For example, the base position may be the home position "H", and the hold position may be the neutral position "N". In this case, the knob 10 may be rotated from the home position "H" to the drive position "D" or the reverse position "R" skipping the neutral position "N".

In the above embodiment, the coupling projections 13 are located proximal to the shaft 11 (knob 10), and the coupling recess 47c are located proximal to the base plate 46. However, this may be reversed so that the coupling recesses 47c are located proximal to the shaft 11, and the coupling projections 13 are located proximal to the base plate 46.

The present examples and embodiments are to be considered as illustrative and not restrictive, and the invention is not to be limited to the details given herein, but may be modified within the scope and equivalence of the appended claims.

The invention claimed is:

1. A transmission shift device, comprising:
   a dial knob configured to be rotatable about an axis and movable when pushed in the axial direction, wherein the axis is fixed to be stationary in a direction orthogonal to the axis, wherein
   when the dial knob reaches a reached position that includes one of a neutral position, a drive position, and a reverse position, a transmission is switched to a mode corresponding to the reached position;
   an alternating action generation unit configured to switch the dial knob, whenever the dial knob is pushed, between a base position and a hold position, which is separated from the base position in the axial direction;
   a base position return unit configured to return the dial knob to the base position when the dial knob has been rotated from the base position;
   a push restriction unit configured to restrict pushing of the dial knob that has been rotated from the base position; and
   a rotation restriction unit configured to restrict rotation of the dial knob that is located at the hold position.

2. The transmission shift device according to claim 1, wherein the hold position is a parking position.

3. The transmission shift device according to claim 1, further comprising:
   a pushing reaction force application unit configured to apply reaction force to the dial knob when the dial knob is pushed; and
   a rotation reaction force application unit formed separately from the push reaction force application unit, wherein the rotation reaction force application unit is configured to apply reaction force to the dial knob when the dial knob is rotated.

4. The transmission shift device according to claim 3, further comprising a coupling switching unit configured to switch the dial knob between a coupling condition and an uncoupling position in correspondence with the position of the dial knob in the axial direction, wherein
   in the coupling condition, the rotation reaction force application unit is coupled to the dial knob thereby allowing the rotation reaction force application unit to apply reaction force to the dial knob, and
   in the uncoupling condition, the rotation reaction force application unit is uncoupled from the dial knob.

5. The transmission shift device according to claim 4, wherein
   the coupling switching unit switches the dial knob to the coupling condition when the dial knob is located at the base position, and
   the coupling switching unit switches the dial knob to the uncoupling condition when the dial knob is located at the hold position.

* * * * *